United States Patent Office 2,926,205
Patented Feb. 23, 1960

2,926,205
PRODUCTION OF CHLOROPRENE

Frederick James Bellringer, Leatherhead, England

No Drawing. Application May 7, 1957
Serial No. 657,485

Claims priority, application Great Britain May 26, 1956

6 Claims. (Cl. 260—655)

The present invention relates to the production of chloroprene, and in particular to the production of chloroprene by the dehydrochlorination of 3:4-dichlorbutene-1.

The production of chloroprene by heating 3:4-dichlorbutene-1 with an aqueous solution of an alkali is well known. Hitherto, theoretical yields of chloroprene have not been attainable owing to the ease with which the chloroprene polymerises during the reaction giving products which for the most part cannot be distilled.

It is an object of the present invention to provide an improved process for the production of chloroprene, in which the formation of chloroprene polymers is appreciably reduced.

According to the present invention, the process for the production of chloroprene by heating 3:4-dichlorbutene-1 with an aqueous solution of an alkali is characterised in that the reaction is carried out in the presence of a picrate.

The presence of picric acid, in the form of a salt, in the reaction medium effectively inhibits the polymerization of the chloroprene and as a result greatly improved yields are obtained. Picric acid may be added to the reaction medium as such, in which case the picrate formed will correspond to the alkali used as the dehydrochlorinating agent in the reaction. Alternatively, a picrate, such as sodium or calcium picrate may be added. The concentration of picrate use is not critical and we have found that concentrations of 0.1 to 1.0% by weight based on the volume of the reaction medium, and calculated as picric acid, are suitable.

In a preferred embodiment, the reaction is carried out by introducing the 3:4-dichlorbutene-1 into a solution of the alkali, such as a 10 to 20% aqueous sodium hydroxide solution, containing a picrate, preferably with stirring or agitation. The solution is maintained above the boiling point of chloroprene, i.e. about 60° C., which is distilled off as it is formed.

The following examples are given further to illustrate the process of the invention. In the examples the parts by weight and parts by volume bear the same relation to each other as do kilograms to litres.

EXAMPLE 1

The apparatus for the dehydrochlorination of 3:4-dichlorbutene-1 consisted of a reaction vessel fitted with agitating means and a distillation column. 40 parts by weight of sodium hydroxide and 0.4 part by weight of picric acid dissolved in 400 parts by volume of water were charged to the reaction vessel, and heated to the boiling point (105° C.), 62.5 parts by weight of 3:4-dichlorbutene-1 were then added over a period of 7 minutes. The product was then distilled at 60° C. for 30 minutes to produce 28.1 parts by weight of a fraction which consisted after drying of 95% chloroprene and 5% 3:4-dichlorbutene-1. The temperature was then raised to 80° C. and 19.0 parts by weight of a fraction consisting of 5% chloroprene and 95% 3:4-dichlobutene-1 was collected. A yield of 62.6% chloroprene was obtained, 91% of the reacted dichlorbutene being converted to chloroprene. 0.6% by weight of the 3:4-dichlorbutene-1 was converted to polymeric products.

EXAMPLE 2

Using the apparatus described in Example 1, 238 parts by weight of sodium hydroxide, and 2 parts by weight of picric acid dissolved in 950 parts by volume of water were charged to the reaction vessel. This gave a 20% wt./wt. solution of caustic soda in 26% excess over the stoichiometrical requirement for the 3:4-dichlorbutene-1. The reaction mixture was heated to 90° C. and 592 parts by weight of 3:4-dichlorbutene-1 were fed in over a period of between 1 and 2 hours. Two fractions were distilled off as in Example 1. A yield of chloroprene of 94.3% based on 3:4-dichlorbutene-1 was obtained. The percent conversion of 3:4-dichlorbutene-1 to polymeric products was nil.

By way of comparison with the above examples when chloroprene was produced in the same apparatus under the reaction conditions described in Example 1, in the absence of any polymerisation inhibitor, or in the presence of hydroquinone or sodium nitrite the following results were obtained, shown in the following table.

Table

| Experiment No. | Inhibitor | Concentration of inhibitor, percent wt./vol. | Percent of 3:4-dichlorbutene-1 converted to polymer |
|---|---|---|---|
| 1 | None | | 7.7 |
| 2 | do | | 7.5 |
| 3 | Hydroquinone | 0.1 | 7.7 |
| 4 | Sodium nitrite | 0.4 | 9.6 |

I claim:
1. The process for the production of chloroprene by heating 3:4-dichlorbutene-1 with an aqueous solution of an alkali characterized in that the reaction is carried out in the presence of an alkali metal picrate.

2. The process for the production of chloroprene which comprises heating 3:4-dichlorbutene-1 with an aqueous solution of an alkali as a dehydrochlorinating agent in the presence of an alkali metal picrate in which the alkali corresponds to that of the dehydrochlorinating agent.

3. The process as claimed in claim 1 wherein the picrate is present in a concentration of 0.1 to 1.0% by weight, calculated as picric acid, and based on the volume of the reaction medium.

4. The process for the production of chloroprene which comprises contacting 3:4-dichlorbutene-1 with an aqueous alkali solution containing an alkali metal picrate, maintaining the solution above the boiling point of chloroprene, and distilling off the chloroprene as it is formed.

5. The process as claimed in claim 4 wherein the aqueous alkali solution is a 10 to 20% aqueous sodium hydroxide solution.

6. The process which compries slowly adding 3:4-dichlorbutene-1 to an alkaline aqueous solution of sodium hydroxide and sodium picrate containing sufficient sodium hydroxide to dehydrochlorinate said 3:4-dichlorbutene-1, dehydrochlorinating said 3:4-dichlorbutene-1 and distilling from the mixture chloroprene substantially free from chloroprene polymer.

References Cited in the file of this patent

UNITED STATES PATENTS

| | | |
|---|---|---|
| 1,950,438 | Carothers et al. | Mar. 13, 1934 |
| 1,950,440 | Jacobson | Mar. 13, 1934 |
| 2,430,016 | Hearne et al. | Nov. 4, 1947 |

FOREIGN PATENTS

| | | |
|---|---|---|
| 521,588 | Canada | Feb. 7, 1956 |

UNITED STATES PATENT OFFICE

CERTIFICATE OF CORRECTION

Patent No. 2,926,205            February 23, 1960

Frederick James Bellringer

It is hereby certified that error appears in the above numbered patent requiring correction and that the said Letters Patent should read as corrected below.

In the grant, lines 1, 2 and 3, for "Frederick James Bellringer, of Leatherhead, England," read -- Frederick James Bellringer, of Leatherhead, England, assignor to The Distillers Company Limited, of Edinburg, Scotland, --; line 12, for "Frederick James Bellringer, his heirs" read -- The Distillers Company Limited, its successors --; in the heading to the printed specification, line 3, for "Frederick James Bellringer, Leatherhead, England" read -- Frederick James Bellringer, Leatherhead, England, assignor to The Distillers Company Limited, Edinburgh, Scotland --.

Signed and sealed this 15th day of November 1960.

(SEAL)
Attest:

KARL H. AXLINE                                   ROBERT C. WATSON
Attesting Officer                                Commissioner of Patents